United States Patent Office 2,965,682
Patented Dec. 20, 1960

2,965,682

RING CHLORINATED α,α-DIHALO-META-XYLENES

Roland J. Horvath, Cleveland, Ohio, assignor to Diamond Alkali Company, Cleveland, Ohio, a corporation of Delaware No Drawing. Filed Apr. 30, 1958, Ser. No. 731,855

6 Claims. (Cl. 260—651)

The present invention relates to novel compounds of the structure:

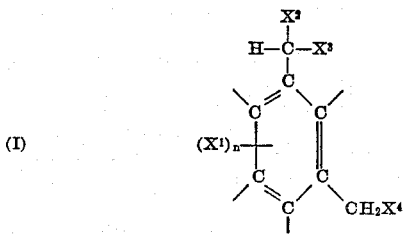

(I)

wherein $n$ is a number from 0 to 4, inclusive; $X^1$ and $X^3$ are halogen atoms, i.e., fluorine, chlorine, bromine, and iodine, chlorine being preferred; $X^2$ and $X^4$ are selected from the group consisting of hydrogen and halogen atoms; any free bonds being satisfied by hydrogen; and wherein when $n$ is 0, then $X^2$, $X^3$ and $X^4$ are halogen; and to their preparation and application.

An object of the present invention is the production of meta-xylene derivatives which can be converted into xylene glycols, such as 2,4-dichloro-m-xylene-alpha,alpha'-diol and 4,6-dichloro-m-xylene-alpha,alpha'-diol readily.

Another object is the production of novel meta-xylene derivatives useful as chemical intermediates.

Still another object of the invention is the provision of novel compounds which are biologically active, e.g., as pesticides, for the prevention of undesired fungus spore germination.

Other objects and advantages will be apparent to those skilled in the art from the following description.

Illustrative and preferred compounds of this invention are ring and chain halo substituted meta xylenes such as alpha,4 - dichloro-m-xylene; alpha,4,6 - trichloro - m-xylene; alpha,alpha',4-trichloro-m-xylene; alpha,alpha',4,6-tetrachloro-m-xylene; alpha,2-dichloro - m - xylene; alpha,alpha',2-trichloro-m-xylene; alpha,2,4-trichloro-m-xylene; alpha,alpha',2,4 - tetrachloro-m-xylene; alpha,alpha,4,6-tetrachloro-m-xylene; and alpha,alpha,alpha'-trichloro-m-xylene.

Compounds within the scope of structure I above may be prepared by halogenating, preferably chlorinating, preferably with the uncombined halogen, a compound of the structure:

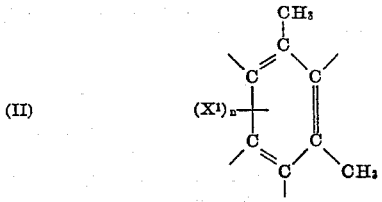

(II)

and separating or isolating the desired product, wherein $n$ is a number from 0 to 4, inclusive, preferably 1 to 4, $X^1$ is halogen, such as chlorine, any free bonds being satisfied by hydrogen.

The reaction is carried out in the presence of a source of actinic radiation, such as light having a wave length of shorter than 4785 A. at a temperature below 80° C., e.g., −20° to 80° C. The reactants are combined in no greater than stoichiometric ratios, e.g., 1 mole of 4,6-dichloro-m-xylene combined with 1.8 moles of chlorine. The reaction generally is complete in less than 10 hours, e.g., ½ to 6 hours when the desired amount of HCl is collected. The low reaction temperature is facilitated by employment of an organic inert solvent especially a chlorinated solvent, such as $CCl_4$, chloroform, chlorobenzene, or the like.

The desired product is isolated typically through distillation at reduced pressure and recrystallization from an organic solvent.

The compounds of the present invention comprise products useful as chemical intermediates; may be used as scavengers in petroleum products; and also exhibit biological activity, i.e., pesticidal activity, especially the control of micro-organism growth, undesired plant and insect growth.

The compounds of the present invention also may be utilized in diverse formulations, both liquid and solid, including finely-divided powders and granular materials, solutions, concentrates, emulsifiable concentrates, slurries and the like, depending upon the biological application intended and the formulation medium desired. Thus it will be appreciated that compounds of this invention may be employed to form biologically active substances containing such compounds as essential active ingredients thereof, which compositions may also include finely-divided dry or liquid diluents, extenders, fillers, conditioners, including various clays, diatomaceous earth, talc, spent catalyst, alumina silica materials and incorporating liquid solvents, diluents, etc., typically water and various organic liquids, such as kerosene, benzene, toluene, xylene, cyclohexanone and other petroleum distillate fractions or mixtures thereof.

When liquid formulations are employed, or dry materials prepared which are to be used in liquid form, it is desirable in certain instances to additionally employ a wetting, emulsifying, or dispersing agent to facilitate use of the formulation, suitable surface active agents being set out, e.g., in an article by John W. McCutcheon in Soap and Chemical Specialties, vol. 31, Nos. 7–10 (1955).

The term "carrier" as employed in the specification and claims is intended to refer broadly to the materials constituting a major proportion of a biologically active or other formulation and hence includes finely-divided material, both liquids and solids, as aforementioned, conventionally used in such applications.

The compounds of the present invention may be used alone or in combination with other known biologically active materials, such as chlorinated hydrocarbons, organic phosphorous compounds, foliage and soil fungicides, pre- and post-emergent herbicides and the like.

The term "fungicide" as used in the specification and claims is intended to refer broadly to a composition of matter effective in controlling or killing collectively or selectively fungus growth which is either parasitic or saprophytic, such as the control of fungus spore germination, blight infestation, e.g., control of early and late blight disease, and chemotherapeutic control of blight and mildew infestation, i.e., the protection of plants by contacting the soil around the plants with a fungicidal amount of a compound within the scope of structure I, and the protection of seeds and seedlings, i.e., the protection of seeds and seedlings from seed decay and damping off fungi; moreover, it is preferred that the fungus be contacted with a fungicidal amount of the composition.

In order to demonstrate this fungicidal activity, a series of tests are run incorporating evaluations of the fungicidal effectiveness of compounds within the scope of structure I against (A) fungus spore germination, i.e., the spore germination of *Alternaria oleracea* and *Monilinia fructicola*, and (B) fungi-caused seed and seedling disease, i.e., the protection of seeds and seedlings from seed decay and damping off fungi.

The procedures of fungicidal evaluations A and B are as follows:

The procedure in fungicidal evaluation A above concerning fungicidal spore germination against *Alternaria oleracea* and *Monilinia fructicola* is:

Spore germination tests on glass slides are conducted via the test tube dilution method adopted from the procedure recommended by the American Phytopathological Society's committee on standardization of fungicidal tests. In this procedure, the product of part A in aqueous formulations at concentrations of 1000, 100, 10 and 1.0 p.p.m. is tested for its ability to inhibit germination of spores from 7 to 10 day old cultures of *Alternaria oleracea* and *Monilinia fructicola*. These concentrations refer to initial concentrations before diluting four volumes with one volume of spore stimulant and spore suspension. Germination records are taken after 20 hours of incubation at 22° C. by counting 100 spores. Each test compound is given a rating which corresponds to the concentration that inhibits germination of half the spores (ED 50 value).

Employing this procedure alpha,alpha',4,6-tetrachloro-m-xylene; alpha,alpha',4-trichloro-m-xylene; alpha,4-dichloro-m-xylene; and alpha,4,6-trichloro-m-xylene receive ratings of less than 10 p.p.m.

The procedure in fungicidal evaluation B above concerning the protection of seeds and seedlings from seed decay and damping off fungi is:

In this test soil infested with seed decay and damping off fungi in 4" x 4" x 3" plant band boxes is treated by a soil drench-mix method at the rate equivalent to 128 lbs./acre. Treatment is accomplished by pouring 70 ml. of a 2000 p.p.m. test formulation (2000 p.p.m. test chemical—5% acetone—0.01% Triton X-155) on the surface of the soil. This is allowed to stand until the next day when the soil is removed from each box and thoroughly mixed before being replaced in the box. Three days after treatment, 25 pea seeds, variety Perfection, are planted to a uniform depth per box. Untreated checks and standardized material are included in each test in addition to a check planted in sterilized soil. Percentage stand is recorded 9 days after planting, indicating 4, 52, 72, and 36 percent stand for alpha,alpha',4,6-tetrachloro-m-xylene; alpha,alpha',4-trichloro-m-xylene; alpha,4-dichloro-m-xylene; and alpha,4,6-trichlor-m-xylene respectively.

The term "herbicide" as used is intended to refer broadly to a composition of matter effective in controlling or killing, collectively or selectively, undesirable plant growth, such as the selective or nonselective control of grasses or broadleaf plants, and the selective or nonselective prevention of seed development. It is preferred that plants be contacted with an herbicidal amount of a compound within the scope of structure I.

In order to demonstrate and compare herbicidal activity, a test is run incorporating evaluations of the herbicidal effectiveness of compounds within the scope of structure I. These evaluations test the ability of the compounds of the present invention to (A) prevent the germination of seeds, i.e., the prevention of germination of broadleaf and grass seeds.

The procedure in herbicidal evaluation A above concerning the prevention of germination of broadleaf and grass seeds is:

To evaluate the effect of the test chemical upon the germination of seeds in soil, a mixture of seeds of six crop plants is broadcast in 8" x 8" x 2" metal cake pans filled to within ½ inch of the top with composted greenhouse soil. The seed is uniformly covered with about ¼ inch of soil and watered. After 24 hours, 80 ml. of an aqueous test formulation (320 mg. test chemical—5% acetone—0.01% Triton X-155—balance water) at 10 lbs. air pressure is sprayed uniformly over the surface of the pan. This is equivalent to 64 lbs./acre. The seed mixture contains representatives of three broadleafs: turnip, flax and alfalfa, and three grasses: wheat, millet and rye grass. Two weeks after treatment records are taken on seedling stand as compared to the controls. Employing this procedure alpha,alpha',4,6-tetrachloro-m-xylene and alpha,alpha',4-trichloro-m-xylene both receive ratings of 100% for the broadleaf and 60% to 40% for the grass species respectively.

The term "nematocide" as used is intended to refer broadly to a composition of matter effective in controlling or killing, collectively or selectively, nematode growth such as the control of plant parasite nematodes, i.e., the control of the root knot nematode (Meloidogyne), and the control of nonplant parasite nematodes, i.e., the control of the sour paste nematode (*Panagrellus redivivus*). It is preferred that the nematodes be contacted with a nematocidal amount of the composition of the present invention.

In order to demonstrate the nematocidal activity of the present invention a series of tests are run incorporating evaluations of the nematocidal effectiveness of compounds within the scope of structure I. These evaluations test the nematocidal activity against the nonplant parasite nematode, *Panagrellus redivivus*, i.e., contact and fumigant control.

The procedure of the nematocidal evaluation above concerning the contact control of the nonplant parasite nematode, *Panagrellus redivivus* is:

Nonplant parasite nematodes (*Panagrellus redivivus*) are exposed to the test chemical in small watch glasses (27 mm. diameter x 8 mm. deep) within a 9 cm. Petri dish. A test formulation comprising 100 p.p.m. test chemical, 5% acetone, 0.01% Triton X-155 and the balance water is used. Observations after 24 hours indicate 100 percent disease control employing alpha,alpha', 4,6-tetrachloro-m-xylene; and alpha,4,6-trichloro-m-xylene; but 0% control for the alpha,4-dichloro-m-xylene.

The procedure of the nematocidal evaluation above concerning the fumigant control of the nonplant parasite nematode, *Panagrellus redivivus* is:

In order to make an in vitro evaluation as a contact poison, nonplant parasite nematodes (*Panagrellus redivivus*), are exposed to the test chemical in small watch glasses (27 mm. diameter x 8 mm. deep), within a 9 cm. Petri dish. An aqueous test formulation (2 mg. test chemical—5% acetone—0.01% Triton X-155—balance water) is used. Percent disease control is recorded 24 hours after treatment indicating at least 95% control employing alpha,alpha',4,6-tetrachloro-m-xylene; alpha, alpha',4-trichloro-m-xylene; alpha,4,6-trichloro-m-xylene; and alpha,4-dichloro-m-xylene.

Concerning the present invention the following specific examples are not to be construed as limiting but rather are offered in order that those skilled in the art may more completely understand the present invention.

EXAMPLE I

*Preparation of alpha,alpha',4,6-tetrachloro-m-xylene*

175 g. (1.0 mol) of 4,6-dichloro-m-xylene and 500 ml. of carbon tetrachloride are placed in a flask equipped with gas sparger, thermometer and reflux condenser. The mixture is heated with an infra-red lamp to reflux. When the temperature of the reaction mixture reaches 42° C. the introduction of chlorine is begun, the reaction being catalyzed by actinic light. 127.8 g. (1.8 mol) of chlorine is added, the temperature being between 42°–73° C. over a period of about 3½ hours. The reaction is completed when a desired amount of hydrogen chloride is collected. The reaction product is then distilled at 159° C. at 7½ mm. Hg pressure yielding alpha,alpha',4,6-tetrachloro-m-xylene. This product is then recrystallized from isopropyl alcohol yielding the desired $C_8H_6Cl_4$ as indicated through the following elemental analytical data:

| Element | Actual, Percent by Wgt. | Calculated, Percent by Wgt. |
|---|---|---|
| C | 39.31 | 39.3 |

EXAMPLE II

*Preparation of alpha,4-dichloro-m-xylene and alpha,alpha',4-trichloro-m-xylene*

210 g. (1.5 mol) of 4-chloro-m-xylene is dissolved in 400 cc. of carbon tetrachloride in a flask equipped with reflux condenser, cooler condenser, thermometer, gas sparger and actinic light source. This reaction mixture is cooled to about −5° C. When the temperature reaches about −5° C., 213 g. (3.0 mol) of chlorine is passed into the mixture at a rate of about 2.8 g. per minute. The temperature of the reaction rises to about 30° C. with an average temperature of about 26.5° C. over a period of about 2 hours. After the reaction is complete, nitrogen is passed through the mixture to remove excess chlorine and HCl. The reaction product is distilled yielding the desired alpha,4-dichloro-m-xylene at 99° C. at 6 mm. Hg pressure having a refractive index at 25° C. of 1.5532, and the intermediate alpha,alpha',4-trichloro-m-xylene distilled between 103°–135° C. at 5½ ml. pressure and finally the desired alpha,alpha',4-trichloro-m-xylene distilled at 138° C. at 6 mm. Hg pressure having a refractive index at 25° C. of 1.5770. The above alpha,alpha',4-trichloro-m-xylene, $C_8H_7Cl_3$, is indicated through the following elemental analytical data:

| Element | Actual, Percent by wgt. | Calculated, Percent by wgt. |
|---|---|---|
| C | 45.49 | 45.8 |
| H | 3.33 | 3.34 |
| Cl | 49.1 | 50.9 |

EXAMPLE III

*Preparation of alpha,4-dichloro-m-xylene*

As indicated in the above Example II the desired $C_8H_8Cl_2$ is distilled at 99° C. at 6 mm. Hg pressure and is also indicated through the following elemental analytical data:

| Element | Actual, Percent by wgt. | Calculated, Percent by wgt. |
|---|---|---|
| C | 54.8 | 54.8 |
| H | 4.40 | 4.57 |
| Cl (hydrolyzable) | 20.15 | 20.3 |

EXAMPLE IV

*Preparation of alpha,4,6-trichloro-m-xylene*

The preparation according to Example II is carried out and the desired $C_8H_7Cl_3$ is distilled at 126°–128° C. at 7½ mm. Hg pressure and is also indicated through the following elemental analytical data:

| Element | Actual, Percent by wgt. | Calculated, Percent by wgt. |
|---|---|---|
| H | 3.26 | 3.34 |
| C | 45.49 | 45.8 |

EXAMPLE V

*Preparation of alpha,alpha,4,6-tetrachloro-m-xylene*

The preparation according to Example II is carried out and upon collection of the desired amount of HCl the above $C_8H_6Cl_4$ is distilled at 114°–115° C. at 5½ mm. Hg pressure and is further indicated by its reaction with $H_2SO_4$ to form 4,6-dichloro-m-tolualdehyde demonstrated through the following elemental analytical data:

| Element | Actual, Percent by wgt. | Calculated, Percent by wgt. |
|---|---|---|
| C | 50.82 | 51.02 |
| H | 3.19 | 3.27 |
| Cl | 37.61 | 37.00 |

EXAMPLE VI

*Preparation of alpha,alpha,alpha'-trichloro-m-xylene*

The general procedure according to Example II is carried out employing m-xylene as a starting material. Upon collection of the desired amount of hydrogen chloride, the above $C_8H_7Cl_3$ is distilled at 129°–130° C. at 5½ mm. Hg pressure and is indicated through the following elemental analytical data:

| Element | Actual, Percent by wgt. | Calculated, Percent by wgt. |
|---|---|---|
| C | 45.9 | 46.4 |
| H | 3.4 | 3.4 |

It is to be understood that although the invention has been described with specific reference to particular embodiments thereof, it is not to be so limited since changes and alterations therein may be made which are within the full intended scope of this invention as defined by the appended claims.

What is claimed is:

1. Compounds represented by the structure:

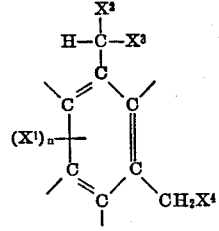

wherein $n$ is a number from 0 to 2, inclusive; $X^1$, $X^2$ and $X^3$ are chlorine atoms; $X^4$ is selected from the group consisting of hydrogen and chlorine atoms; any free bonds being satisfied by hydrogen; and wherein when $n$ is 0, then $X^2$, $X^3$ and $X^4$ are chlorine.

2. Alpha,alpha,4,6-tetrachloro-m-xylene.
3. Alpha,alpha,alpha'-trichloro-m-xylene.
4. The method of preparing compounds of the structure:

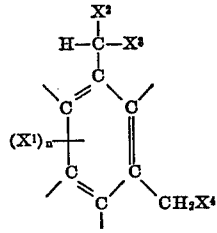

which comprises reacting chlorine with a compound of the structure:

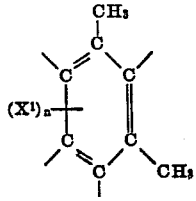

wherein $n$ is a number from 0 to 2, inclusive; $X^1$, $X^2$ and $X^3$ are chlorine atoms; $X^4$ is selected from the group consisting of hydrogen and chlorine atoms; any free bonds being satisfied by hydrogen; wherein when $n$ is 0, then $X^2$, $X^3$ and $X^4$ are chlorine; and which reactants are combined at reflux temperature in no greater than stoichiometric amounts in the presence of actinic radiation.

5. The method of preparing alpha,alpha,4,6-tetrachloro-m-xylene which comprises reacting 4,6-dichloro-m-xylene with chlorine at reflux temperature, in the presence of actinic light and in no greater than stoichiometric amounts.

6. The method of preparing alpha,alpha,alpha'-trichloro-m-xylene which comprises reacting m-xylene with chlorine at reflux temperature, in the presence of actinic light and in no greater than stoichiometric amounts.

References Cited in the file of this patent

UNITED STATES PATENTS

| | | |
|---|---|---|
| 1,867,766 | Schindhelm | July 19, 1932 |
| 2,293,772 | Soday | Aug. 25, 1942 |
| 2,293,773 | Soday | Aug. 25, 1942 |
| 2,412,389 | Cass | Dec. 10, 1946 |
| 2,548,480 | Kittleson | Apr. 10, 1951 |
| 2,548,509 | Yowell | Apr. 10, 1951 |